Jan. 3, 1961  A. J. WILTSHIRE  2,966,935
WINDING MACHINE FOR PRESSURE VESSELS
Filed Oct. 9, 1957  7 Sheets-Sheet 1

INVENTOR.
ARTHUR J. WILTSHIRE
BY
W. G. Sullivan
ATTORNEY

INVENTOR.
ARTHUR J. WILTSHIRE
BY W. G. Sullivan
ATTORNEY

INVENTOR.
ARTHUR J. WILTSHIRE
BY W. G. Sullivan
ATTORNEY

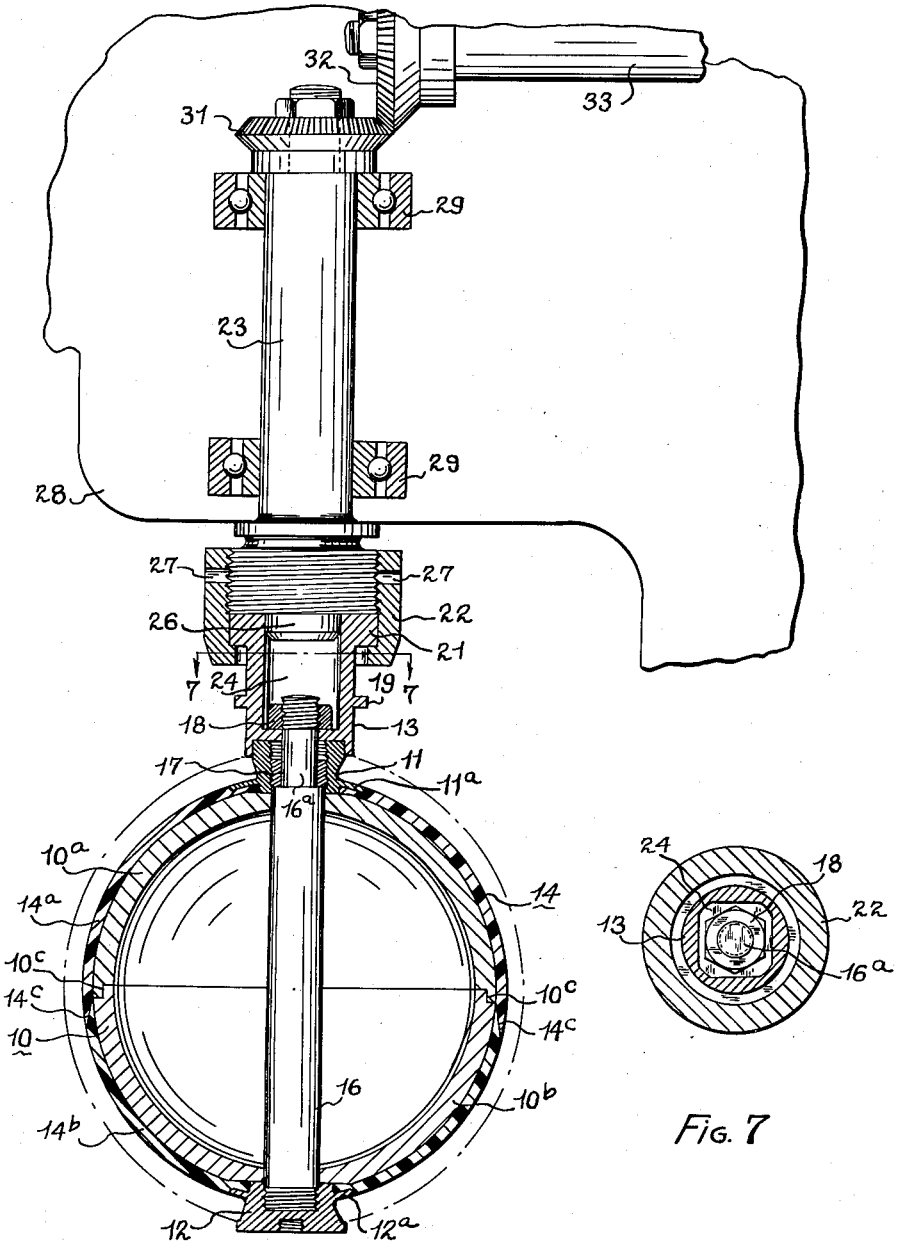

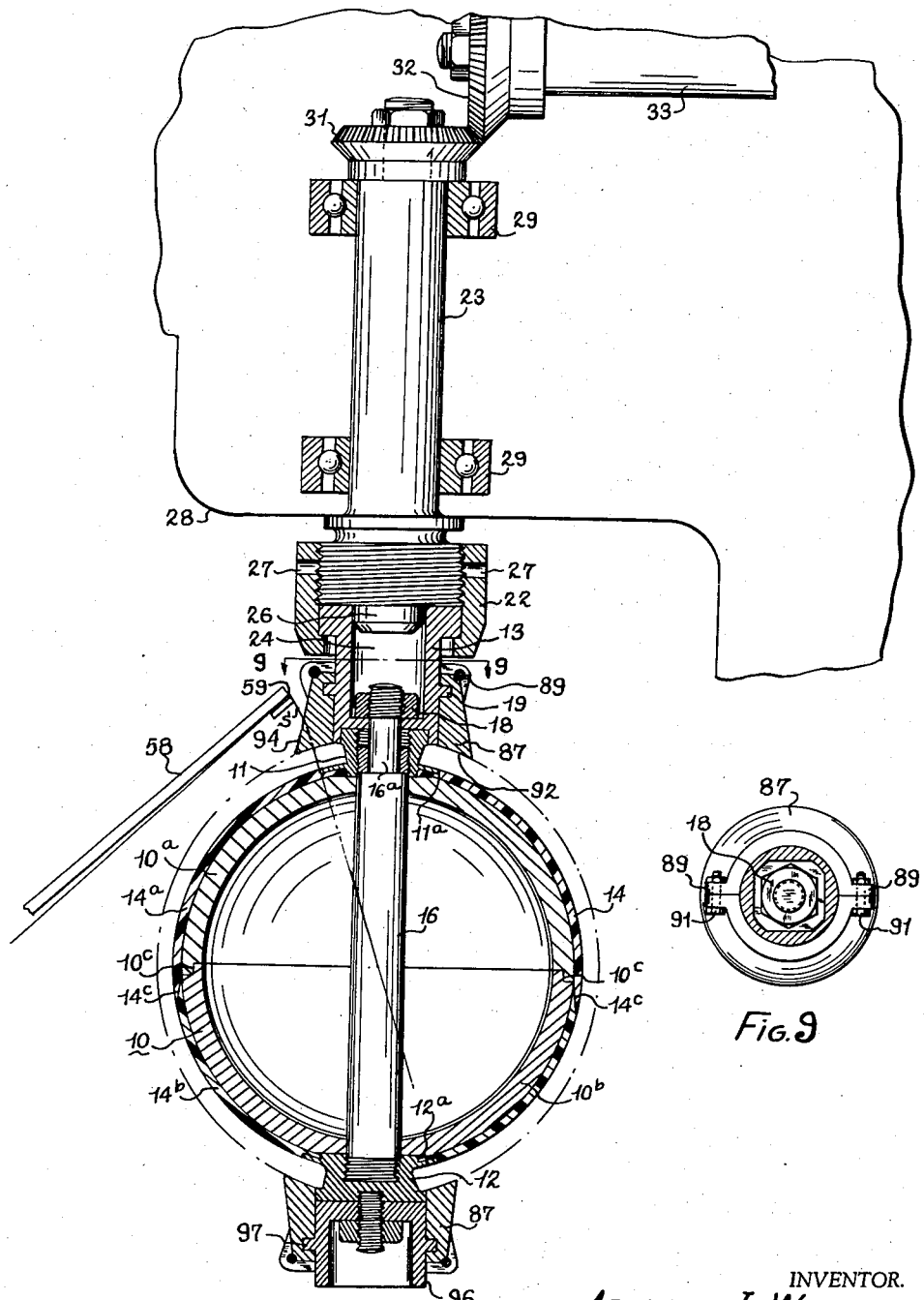

United States Patent Office 2,966,935
Patented Jan. 3, 1961

2,966,935
WINDING MACHINE FOR PRESSURE VESSELS

Arthur J. Wiltshire, Richmond Heights, Ohio, assignor to White Sewing Machine Corporation, Lakewood, Ohio, a corporation of Delaware Filed Oct. 9, 1957, Ser. No. 689,170

6 Claims. (Cl. 154—1.8)

This invention relates to apparatus for forming a pressure vessel from a substantially continuous strand of flexible material, and more particularly to a winding machine adapted to form a pressure vessel of generally spherical shape.

In my co-pending application, Serial No. 362,898, filed June 19, 1953, entitled Pressure Vessel and Method of Making the Same, I disclosed apparatus for forming a pressure vessel of generally spherical form by winding a substantially continuous strand of flexible material about a form to provide a wall adapted to withstand relatively high internal pressure. As disclosed in the aforesaid application the windings were applied substantially in great circle paths and in successive layers with the windings cemented together by a bonding material such as an epoxy resin. The aforesaid apparatus comprised means for rotating the form about a horizontal axis while an arm through which the strand of flexible material passed was oscillated to first sweep from one axial end zone of the form to the opposite end zone and the feeding stroke of the arm was gradually decreased until a wall of desired thickness was formed. The bonding material or resin was applied during the winding operation and upon curing of the resin and removal of the form a pressure vessel was provided which would expand substantially uniformly in response to internal pressure.

The aforementioned apparatus and method produced pressure vessels which were highly successful for the uses intended but since the strand material was fed from one side of a vertical plane passing through the axis of the form it was necessary to provide a dwell period at each end of the stroke until the form had revolved through a pre-determined arc. This resulted in a relatively slow winding operation and required rather complicated and expensive apparatus.

I have devised an improvement on the aforesaid method and apparatus wherein the winding for a given pressure vessel can be completed in a relatively shorter period and with less complicated and less expensive apparatus.

According to the invention, I suspend a spherical or the like form from a vertical shaft adapted to rotate the form about a vertical axis. The shaft engages a flanged fitting mounted on the form and a needle or feed arm having an eye through which a strand of flexible material passes to the form is adapted to initially sweep the eye in a substantially great circle path causing the strand windings to pass over the fitting flange or in a path slightly inclined from the vertical. The windings continue as the form is slowly rotated until a desired wall thickness is built up at the fitting zone. The winding arm or needle is then gradually tilted whereby the eye causes the windings to be gradually disposed in substantially great circle paths more inclined from the vertical and this tilting of the arm is continued until the eye causes the windings to traverse near the equatorial zone of the form or a zone mid-way between the vertical poles of the form. During winding the bonding material or resin in liquid form is applied and after curing of the resin the form material, preferably a low melting point alloy, is melted and discharged through the fitting.

It is a primary object of the invention to provide improved apparatus for forming a pressure vessel having a wall formed of a substantially continuous strand of flexible material wound in generally great circle paths and in successive layers.

Another object of the invention is to provide apparatus of the above type which permits the winding operation to be completed in a relatively short time.

Another object of the invention is to provide apparatus of the above type which is relatively simple in operation and relatively inexpensive of manufacture.

Another object of the invention is to provide apparatus for producing pressure vessels of the type defined at reduced cost.

Other objects of the invention and the invention itself will become increasingly apparent from a consideration of the following description and drawings wherein:

Figure 6 is a vertical sectional view showing the manner of securing a supporting arbor to the winding form;

Figure 7 is a transverse section taken along the line 7—7 of Figure 6;

Figure 8 is a view similar to Figure 6 showing the manner of mounting supplemental winding collars which I may optionally employ;

Figure 9 is a transverse section taken along the line 9—9 of Figure 8;

Figures 1, 2:
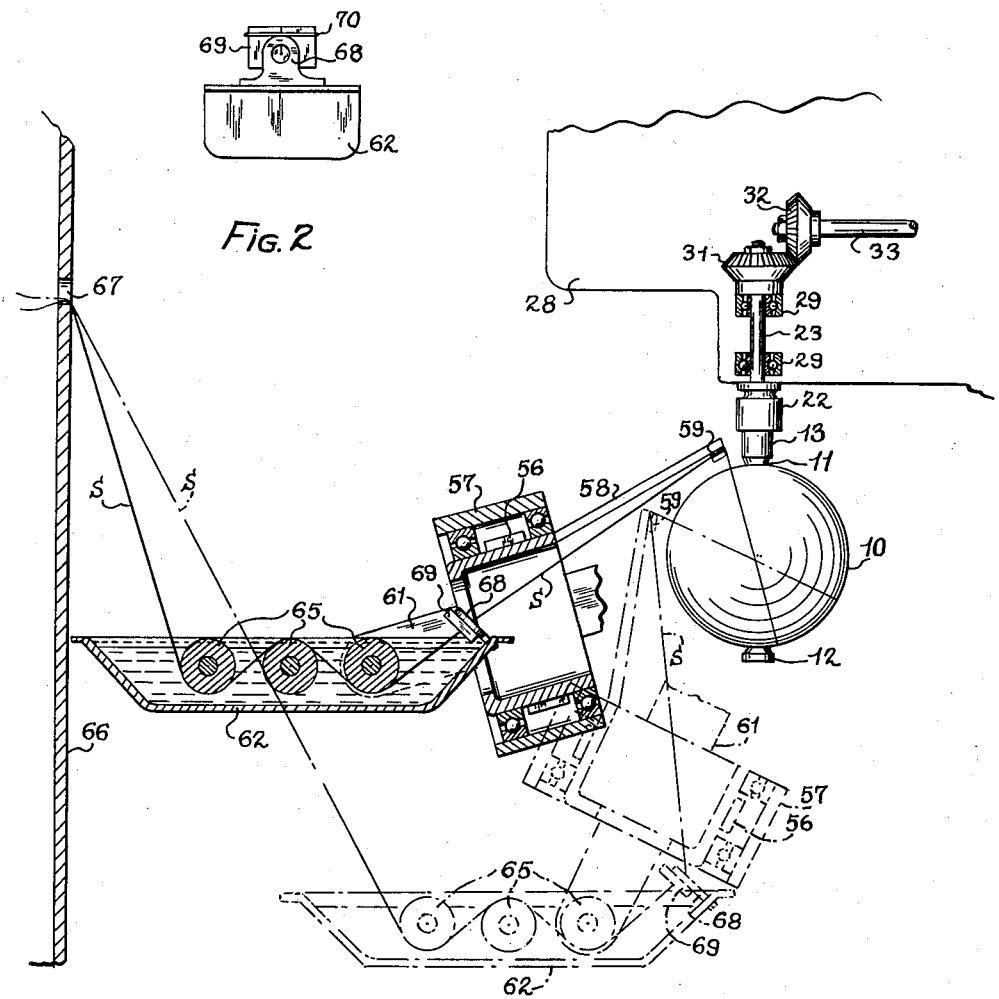
Figure 1 is a diagrammatic elevational view of apparatus embodying the invention.
Figure 2 is a front or right hand view of the resin trough and wiping device illustrated in Figure 1.

Referring now to the drawings, particularly Figures 1 and 6, I have indicated at 10 a spherical form which has fittings 11 and 12 disposed at each end of its vertical or polar axis. Each fitting is formed with a radially outwardly extending and preferably circular flange as indicated at 11a and 12a and at least fitting 11 has a threaded bore serving as a fluid entry and discharge port and permitting engagement with the lower end of a vertically extending drive coupling 13.

In some cases fitting 12 may be a blind fitting used either to support the finished pressure vessel or permit lifting thereof. Form 10 is cast from a low melting point alloy metal in two semi-spherical halves indicated at 10a and 10b, joined in dovetail relation as indicated at 10c. In the embodiment of the pressure vessel illustrated in Figure 1 the vessel is provided with an inner rubber liner 14 comprising an upper semi-spherical part 14a to which fitting 11 is secured in any suitable manner as by cementing and a lower similar part 14b to which fitting 12 is secured. The liner parts 14a and 14b are cemented together by a scarf joint as indicated at 14c. The form halves 10a and 10b are provided with aligned holes to receive an arbor 16 which is threaded into lower fitting 12 and are flatted externally to provide a firm seat for the fittings. Arbor 16 has a reduced diameter stem 16a which projects above fitting 11 and the arbor is maintained aligned and locked in position by a collar 17 which is threaded into the bore of fitting 11 and abuts the arbor shoulder. Collar 17 may be formed with slots for rotation by a prong wrench or the like.

After the parts so far described are assembled as illustrated in Figure 6 drive coupling 13 is engaged with fitting 11 and secured to arbor 16. The upper portion of the fitting is generally hexagonal in contour and the lower portion of coupling 13 has a similarly shaped recess adapted to receive the fitting for driving engagement. The coupling is locked to the fitting by a nut 18 which is threaded to the upper portion of arbor stem 16a. Coupling 13 is formed with an external circular flange 19 for a purpose to be later described and terminates upwardly in an enlarged diameter portion 21 which seats against the base of a collar 22 adapted to be threaded to the lower end of a vertical drive shaft 23. Coupling 13 is formed with a recess 24 generally square in contour and the lowermost reduced end 26 of shaft 23 is of similar contour to be received in recess 24 and effect driving engagement between shaft 23 and the coupling. Collar 22 is formed with transverse holes 27 for rotation by a spanner wrench.

Figure 5:
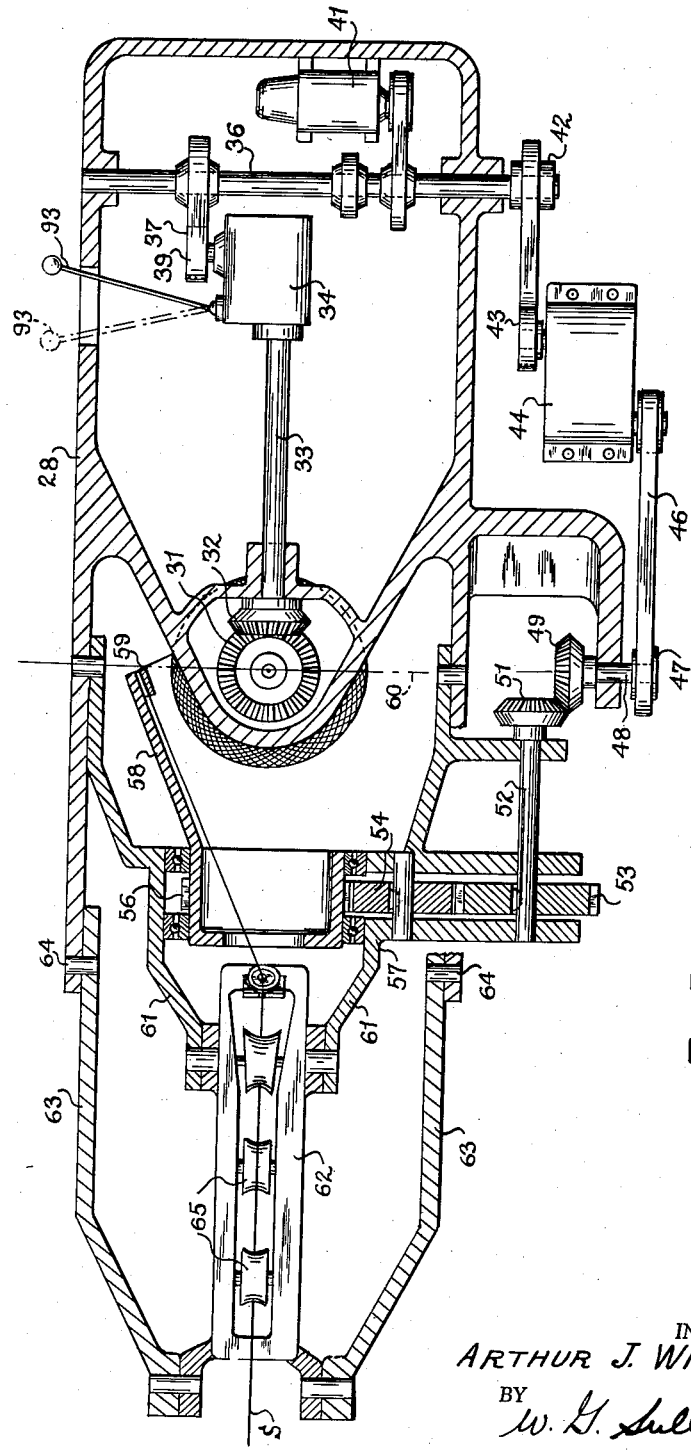
Figure 5 is a horizontal sectional view showing drive mechanism I employ.
Figure 12:
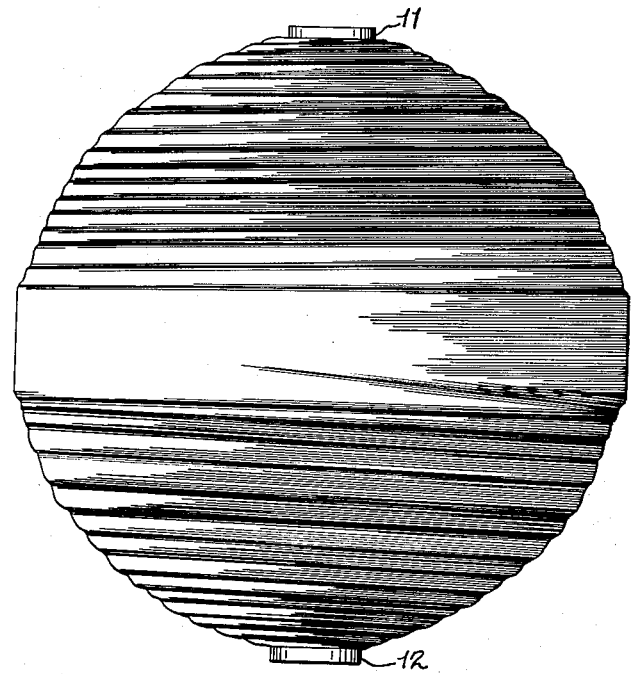
Figure 12 is an elevational view of a pressure vessel formed with apparatus embodying the invention.

It will now be apparent that form 10, liner 14, fittings 11 and 12, and the arbor 16 are supported by shaft 23 and will be rotated when the shaft is rotated. The drive mechanism associated with shaft 23 is encased in a housing generally indicated at 28 and through which the lower portion of the shaft extends. Suitably mounted within the housing are a pair of spaced ball bearings 29 which rotatably support the shaft. A bevel gear 31 fixed to the upper end of shaft 23 engages a second bevel gear 32 fixed to one end of a horizontal shaft 33. As best illustrated in Figure 5 shaft 33 is driven through a gear reduction unit 34 operable from a transverse drive shaft 36 through a roller chain 37 engaging a sprocket 39 associated with the unit 34. Shaft 36 is journaled in the side walls of housing 28 and is belt driven from a variable speed electric motor 41. One end of shaft 36 extends through housing 28 and has a sprocket 42 affixed thereto which is chain connected to a sprocket 43 on a gear reduction unit 44. A second sprocket associated with unit 44 is connected by a chain 46 with a sprocket 47 fixed to a short shaft 48. A bevel gear 49 fixed to the opposite end of shaft 48 meshes with a bevel gear 51 fixed to one end of a shaft 52.

A spur gear 53 fixed to shaft 52 meshes with a spur gear 54 which in turn meshes with a rotatable gear 56 journaled in a housing 57. A needle arm 58 formed with an eye 59 is integral with gear 56 and extends therefrom to dispose the eye 59 adjacent form 10. Housing 57 is pivoted to the walls of housing 28 on an axis 60 passing through the center of form 10 and co-axial with the axis of bevel gear 49. Housing 57 includes a pair of spaced arms 61 which pivotally support one end of an elongate resin trough 62.

The opposite end of the trough is pivotally supported by a second pair of arms 63 which have their inner ends pivotally connected to housing 28 as indicated at 64. Disposed within trough 62 are a plurality, such as three, tension contact buttons 65 which are grooved to receive the fiber glass strand S in its passage from a creel box generally indicated at 66 to the eye 59 of the needle arm 58 and thence to the form 10. The strand S preferably passes beneath the end buttons and over the middle button and the buttons which are non-rotatable are preferably adjustable vertically in any suitable manner to vary the tension or drag exerted on the strand S in passing through the trough. The strand S may comprise a plurality of rovings or ends, such as thirty, which are supplied from individual cakes within the creel box and pass through an opening 67 therein to the trough. The fiber glass ends are loosely gathered together in passing through creel box opening 67 and are further compacted through the grooves in buttons 65. To guide the strand S in its passage from trough 62 to eye 59 and wipe excess liquid resin from the strand I mount a perforated inclined plate 68 at the forward end of the trough which supports a felt or the like pad 69. Pad 69 has a vertical slit therein and after insertion of the strand S in the slit and through the perforation in plate 68 the pad slit portions are held together by a tie loop 70.

Figure 3:
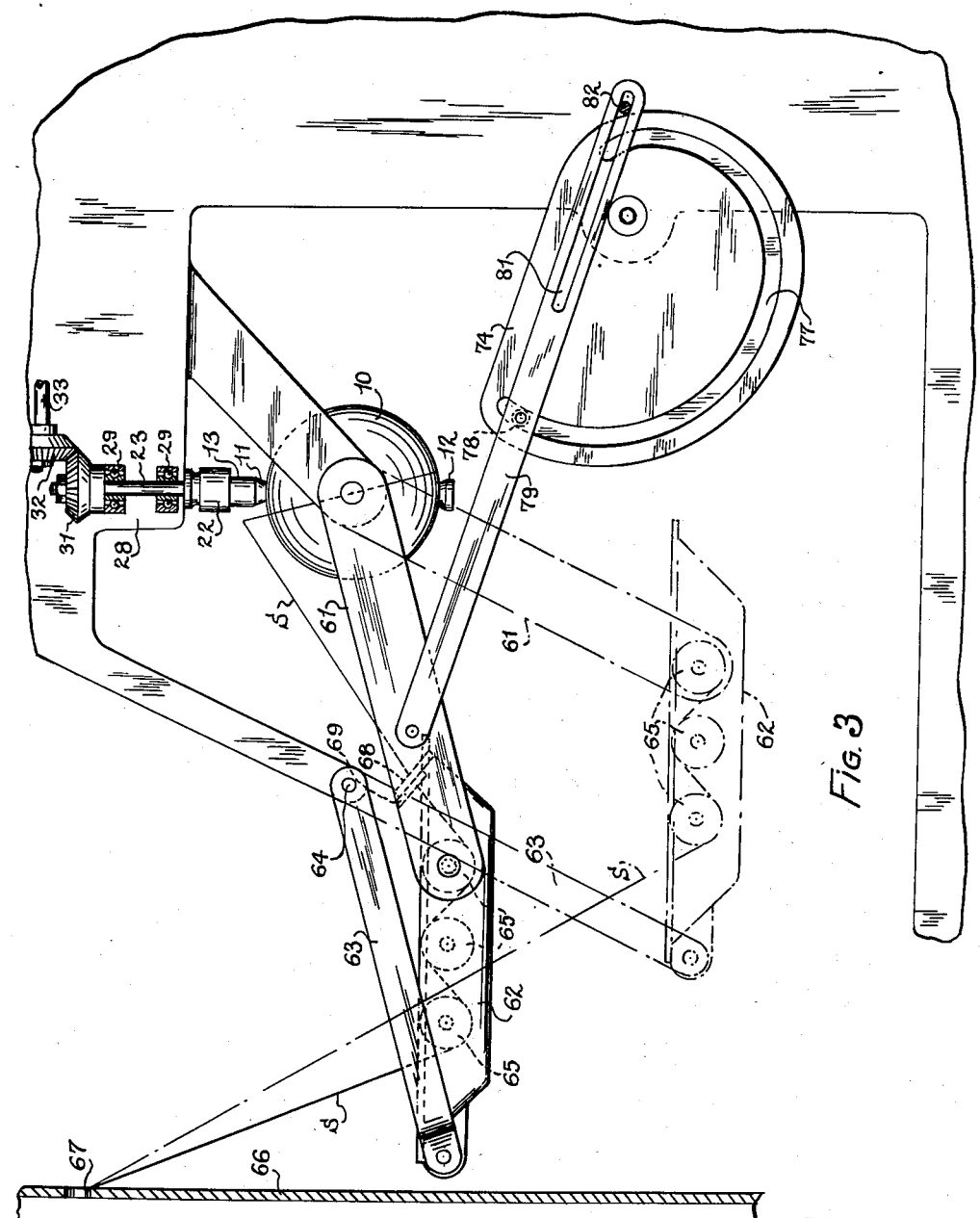
Figure 3 is an elevational view, partially diagrammatic, showing the manner of supporting and controlling movement of the resin trough.
Figure 4:
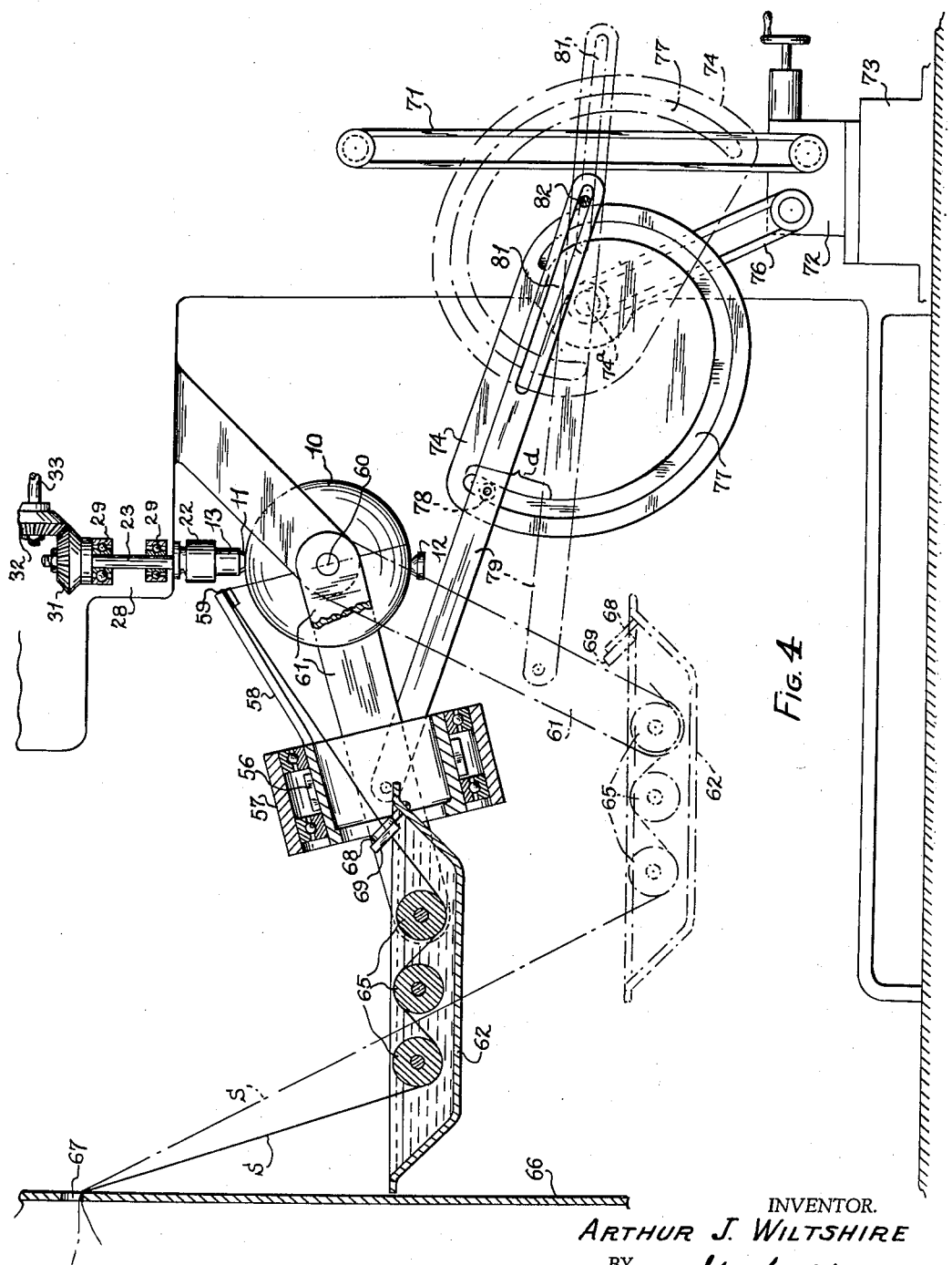
Figure 4 is an elevational view, partially in section, of mechanism for effecting movement of a needle or feed arm I employ.

Referring now to Figures 3, 4 and 5 the drive shaft 36 rotatable by electric motor 41 has a sprocket affixed thereto which drives a chain 71. Through a gear reduction unit 72 mounted on a bed plate 73 chain 71 is adapted to rotate a cam 74 through a second chain drive 76. In Figure 4 the position of cam 74 at the start of the winding operation is shown in full lines and the cam position at the finish of the winding operation is shown in dotted lines. Cam 74 is formed with a slot 77 which receives a roller 78 fixed to the intermediate portion of an arm 79. Slot 77 for a distance $d$, corresponding to an angle such as 20°, is at a constant radius from the cam axis 74a and then the slot follows a generally spiral path or a path gradually approaching the cam axis 74a. The outer end of arm 79 is pivoted to one of the arms 61 which are integral with housing 57 carrying the needle arm 58 and the inner end of the arm is formed with an elongate slot 81 which receives a fixed pin 82. It will be apparent that as cam 74 is slowly rotated in a clockwise direction from its full line position shown in Figure 4 roller 78 will not be moved while the cam is traversing the distance $d$. However, as the cam continues to rotate the subsequent spiral path of the slot will draw the roller 78 closer to the cam axis 74a and resultantly rock housing 57 and needle arm gear 56 downwardly about axis 60. This results in increased tilting of needle arm 58 and a resultant greater angle of inclination of the strand winding paths effected by the position of needle eye 59 relative to a vertical plane passing through axis 60. It will also be apparent that as the arms 61 are rocked downwardly in a counterclockwise direction trough 62 will be carried downwardly at an even keel since arms 61 and 63 which pivotally support the trough are of the same length and maintained in parallel relation.

The manner of forming a pressure vessel by employing the apparatus described will now be explained. The form 10 as previously explained is in the shape of a sphere having a diameter generally conforming to the internal diameter of the finished pressure vessel. The size of the pressure vessel will vary with requirements and may have an internal diameter greater or less than 17 inches. For a vessel having an internal diameter of 17 inches the weight of the cast metal I preferably employ for the form 10 is approximately 300 pounds. This is an alloy of tin and bismuth marketed under the trade name Cerro-Tru and has a melting point of approximately 280° F. which is substantially higher than any temperature at which the epoxy resin used would be cured. It is understood that resins of the type used as the bonding agent will slowly cure at room temperature but to accelerate curing I preferably dispose the wound pressure vessel and encased form 10 in a baking oven having a temperature such as 225° F. for four hours. It is desirable that the thermosetting resin be thoroughly cured or hardened before any softening of the form metal occurs. The manner of supporting form 10, the encasing rubber liner 14 and the fittings 11 and 12 by the arbor 16 has been explained in connection with Figure 6. Also the manner of rotating the form, liner and fittings by shaft 23 has been explained. It will be noted that each fitting 11 and 12 has a necked in portion outwardly of the fitting flanges 11a and 12a and it is desired that the initial strand windings fit snugly into these portions and overlie the flanges. Also it is desired that each winding follow a substantially great circle path. Accordingly, the needle eye 59 is initially positioned as close as possible to the fitting 11 while maintaining clearance as the needle arm is revolved. The free end of strand S after passing through eye 59 is cemented to form 10 or otherwise secured thereto. Motor 41 is then energized which concurrently effects rotation of needle arm 58 in a circular path passing adjacent to fittings 11 and 12 and relatively slow rotation of form 10 about a vertical axis. The resin lubricates the strand S and this together with the slow rotation of the form causes the initial windings to slide into and abut the necked out portion of the fittings and overlie the fitting flanges at the juncture with the necked out portions. The ratio of needle arm revolutions to form rotation is such that each succeeding winding at the fittings is advanced slightly relative to the preceding winding. For example, I have found that for a form 17 inches in diameter a desired close winding can be effected if 300 windings are applied while the form makes one revolution which means that each succeeding winding is tangent to the fitting necked out portions at a point one three-hundreth of the portion circumference beyond the preceding winding. As the form 10 rotates through several revolutions successive layers of windings are applied at the necked out portions of the fittings until a desired wall thickness at this zone is achieved. During this period the winding path followed by the needle eye 59 remains constant and the time required to achieve the desired wall thickness determines the distance d of cam slot 77 (Figure 4).

Figure 10:
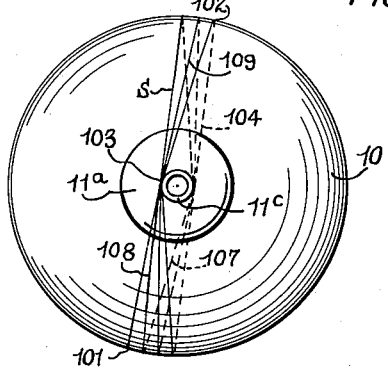
Figure 10 is a diagrammatic top plan view of the winding form showing initially applied windings.

After the desired wall thickness at the fitting zones is achieved continued movement of cam 74 effects gradual tilting of needle arm 58 while it continues to revolve at a constant speed thereby gradually building a desired wall thickness proceeding from the fittings towards the mid or equatorial zone of the form. It is obviously desirable that the vessel be uniformly resistant to internal pressure and to compensate for the lack of wall area at the fittings it will be noted that the wall thickness is gradually increased proceeding towards the fittings as illustrated in Figures 6 and 10. Referring to Figure 9 I have illustrated in plan view the application of the initial winding which overlie fitting flange 11a and abut the fitting necked out portion indicated at 11c. The application will be the same whether an inner liner 14 is used or the windings are applied directly to form 10. Assuming the form is rotating clockwise and arm 58 revolves from point 101 where the free end of strand S is secured to point 102 over the top portion of the form the strand S will be tangent to fitting portion 11c at point 103. As arm 58 continues to revolve in a substantially great circle path around the form the winding path is along dotted line 104, tangent to the necked in portion of lower fitting 12, along dotted line 107, lines 108 and 109, and continues as indicated. It will be apparent that by the time the second winding is applied tangent to fitting 11 as indicated by lines 108 and 109 that the first tangent point 103 has progressed clockwise so that the tangent points are slightly spaced and do not overlie each other. It will be noted by reference to Figures 1 and 11 that a band is applied at the mid zone of the vessel during final winding since it is not necessary to achieve the desired wall thickness at this zone to continue tilting of arm 58 further towards vertical. This is effected by having cam slot 77 terminate in a constant radius arc.

Figure 11:
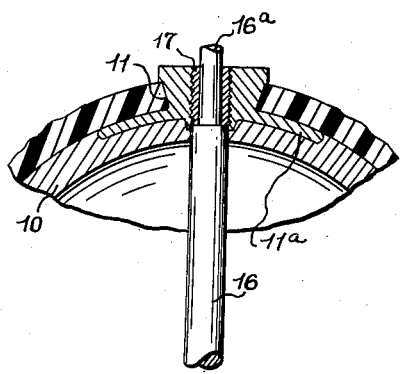
Figure 11 is a fragmentary sectional view showing a modified form of pressure vessel wherein an inner shell or liner is omitted.

Referring to Figure 11 I have illustrated a modified form of pressure vessel wherein the inner liner 14 is omitted. The rubber liner does not contribute appreciably to the strength of the vessel but is provided to prevent fluid leakage through the vessel walls, particularly when the vessel is intended to hold fluids under pressure which might attack the fiber glass or resins. For certain applications it is not necessary to provide an inner liner. In this modification form 10 is formed of two molded halves as in the embodiment of Figure 6 but each half is recessed so that the outer surface of the fitting flanges 11a and 12a will be flush with the external spherical surface of the form. The strand windings are applied as previously described.

Referring to Figure 8 the form 10 and associated parts are supported as previously described but I provide supplemental winding collars which permit the windings at the fitting zones to proceed in a limited arc around the fittings before continuing their great circle paths. This provides an increased strand length at the fitting zone and a more secure locking of the fitting to the wall of the pressure vessel. As previously pointed out coupling 13 is formed with an external circular flange 19. Supported by the flange is a winding collar generally indicated at 87 which comprises semi-circular halves having lateral ears 89 through which bolts 91 are projected and secured by nuts to detachably clamp the collar to coupling 13. The lower face of the collar is curved as indicated at 92 to conform to the desired outer contour of the pressure vessel wall at this zone. Since it is desired that the initially applied windings not only overlie the fitting flanges 11a and 12a and abut the necked in portions of the fittings but extend in a limited arc around the fittings it is necessary that the rotational speed of form 10 be increased relative to the revolving speed of needle arm 58.

Referring to Figure 5 the increased speed of form 10 is effected by a change gear lever 93 extending from gear reduction unit 34 whereby when the lever is in the full line position the form will be rotating at slow speed and when the lever is moved to the dotted line position the form rotational speed will be substantially increased. It will be noted that this change does not change the speed of needle arm 58. The wrap around or arc of strand contact with the fittings can be varied but I have found a contact arc of about 22½° to be desirable. Assuming strand S has just contacted the inclined wall 94 of winding collar 87 and arm 58 is moving towards the observer. When the strand has wrapped around wall 94 a certain amount the combined lubricating effect of the resin and the tension on the strand will cause the strand to slip off the collar wall and snug into contact with the necked in portion and overlie the fitting flange at its juncture with the necked in portion. It will be apparent that the rotational speed of form 10 as determined by the gear ratio can determine the extent of the contact arc. After leaving the fitting the winding continues in a substantially great circle path to the other fitting where it makes a similar contact arc and then proceeds along a substantially great circle path back to the first fitting. This type winding is continued as successive layers of windings are built up around the fitting and radially outwardly of the fitting to the periphery of collar face 92. Lever 93 is then moved to its full line position and the subsequent windings continue in substantially great circle paths as explained in connection with Figure 6. The form rotation in this case is also controlled so that each succeeding wrap winding is advanced slightly relative to the preceding winding. To provide a support for the winding collar associated with fitting 12 I secure a cup shaped member 96 to the fitting which is formed with a flange 97 projecting into the assembled collar.

After the winding is completed in each case the arbor 16 is disengaged from coupling 13 by unthreading collar 22 from shaft 23 and removing bolt 18 from arbor stem 16a. In the modification of Figure 8 the cup shaped member 96 and lower winding collar are detached from lower fitting 12. The wound vessel including form 10, the fittings 11 and 12, and the arbor 16 in assembled relation as indicated in Figures 6, 8 or 11 is then placed in a bake oven for a pre-determined time to harden or cure the resin. The curing time is dependent upon the size and wall thickness of the pressure vessel and also of the type of resin used. For a pressure vessel having an internal diameter of 17 inches, a wall thickness approximately three-fourths of an inch, and with an epoxy resin as the bonding agent I have found that a curing time of four hours at a temperature of 225° F. is satisfactory.

After the resin has been cured the assembly is removed from the bake oven and arbor 16 is removed by detaching collar 17 from fitting 11 and unthreading the arbor from fitting 12. The wound vessel including the fittings, liner 14 if a liner is used, and the encased form 10 are then placed in a fixture with fitting 11 lowermost and subjected to a temperature such as 300° F. sufficient to melt the form metal which flows through fitting 11 and is captured for re-use.

It will now be understood that I have provided apparatus for forming a pressure vessel or the wall of a pressure vessel by winding a normally continuous strand of high tensile strength flexible material in substantially great circle paths about a spherical form slowly rotatable about a vertical axis whereby the strand will be applied in successive layers to form a wall and lock flanged fittings engaging the form at its axis securely to the wall. In one embodiment the substantially great circle windings are initially applied at the fitting zones or poles and the subsequently applied windings are disposed intermediate the fitting zones. In another embodiment the initial windings are also applied at the fitting zones but instead of following substantially great circle paths each wrap winding at these zones follows an approximate half great circle path from one fitting then follows an arc such as 22½° around the opposite fitting and then returns to the first fitting along an approximate half great circle path. In other words, each approximate half wrap winding is offset relative to its complementary approximate half wrap winding by the amount the winding extends in a generally horizontal path around the fitting. Axially inwardly of the fitting zones each wrap winding follows a substantially great circle path.

Although I have described the invention in connection with use of a fiber glass strand it is equally adaptable to the use of a metal strand such as music wire. In this case a metal liner might be substituted for the rubber liner 14 and since a metal liner of this type is of sufficient strength to withstand the winding pressure without deformation it is not necessary to use a form 10 of low melting point metal and the liner to which the fittings are secured serves as the winding form and becomes a permanent part of the pressure vessel. The bonding agent in this case could be a thermosetting resin such as polyester, epoxy or phenolic.

I have described and illustrated the winding form 10 as being rotatable about a vertical axis and this is highly desirable when the form is relatively heavy. However, in the event a metal liner replaces the rubber liner and serves as the winding form or in the case of relatively small pressure vessels where the form metal is correspondingly light I contemplate it may be desirable to rotate the form about an axis other than vertical.

I wish it to be understood that I do not desire to be limited to the exact details of construction shown and described for obvious modification will occur to persons skilled in the art.

What I claim is as follows:

1. Apparatus for making filament wound pressure vessels comprising a form-supporting shaft, means to rotate said form-supporting shaft, a spherical cast metal form secured to one end of said form-supporting shaft, a trunnnion fixture having a trunnion axis extending through the center of said spherical form normal to the axis of said form-supporting shaft, a bearing cage supported in said trunnion fixture, said bearing cage having its axis in a plane through said form-supporting shaft, a winding needle arm journalled in said bearing cage and extending therefrom toward said spherical form, the outer free end of said winding arm terminating in a plane through said trunnion axis, means to rotate said winding arm in said bearing cage to swing the outer end of said arm and a filament winding carried thereby in great circle paths around said spherical form adjacent the poles thereof, said means to rotate said form-supporting shaft progressing said spherical form about its axis in timed relation to the rotation of said winding arm, and means moving in timed relation to said arm to swing said trunnion about its trunnion axis to form successive layers of windings of lesser polar extent than said first-named great circle windings.

2. Appartaus for making filament wound pressure vessels comprising a frame, a form-supporting shaft in the frame, means to rotate said form-supporting shaft, a spherical cast metal form secured at one pole thereof to one end of said form-supporting shaft, a trunnion fixture on the frame having arms at each side of said form and a trunnion axis extending through the center of said spherical form normal to the axis of rotation of said form-supporting shaft, a bearing cage supported in said trunnion fixture, said bearing cage having its axis in a plane through said form-supporting shaft, a winding needle arm journalled in said bearing cage and extending therefrom toward said spherical form, means to rotate said winding arm in said bearing cage to swing the outer end of said arm and a filament winding carried thereby in great circle paths around said spherical form adjacent the poles thereof, said means to rotate said form-supporting shaft progressing said spherical form about its axis in timed relation to the rotation of said winding arm to form layers of windings from pole to pole on the form, and means to swing said trunnion about said trunnion axis to form successive layers of great circle windings of lesser polar extent than said first-named layers.

3. Apparatus for making fiber glass wound pressure vessels comprising a frame, a form-supporting shaft in the frame, means to rotate said form-supporting shaft, a spherical form secured at one pole thereof to said form-supporting shaft, spaced brackets mounted on the frame and extending at opposite sides of the form, aligned journals in the brackets providing a trunnion axis extending through the center of said spherical form normal to the axis of said form-supporting shaft, a trunnion fixture mounted on said brackets, a bearing cage supported in said trunnion, said bearing cage having its axis in a plane through said form-supporting shaft, a winding needle arm journalled in said bearing cage and extending therefrom toward said spherical form, a fiber glass strand eyelet at the outer free end of the winding arm, the outer free end of said winding arm terminating in a plane through said trunnion axis, means to rotate said winding arm in said bearing cage to swing the outer end of said arm and the strand carried thereby in great circle paths around said spherical form, said means to rotate said form-supporting shaft progressing said spherical form about its axis in timed relation to the rotation of said winding arm, and means to move said trunnion fixture about its trunnion axis to form layers of great circle windings.

4. Apparatus for makng wound fiber glass pressure vessels which comprises a frame, a spherical form, a rigid tubular member extending through said form from one pole of the sphere to an opposite pole, a form-supporting shaft mounted in the frame for rotation about the axis of the shaft, one end of said form-supporting shaft secured to one end of said tubular member in the form with the axis of the tubular member coincident with the axis of the form-supporting shaft, a pair of spaced trunnion brackets on the frame having their outer free ends spaced from said spherical form and being apertured to provide a trunnion axis extending through the center of said spherical form, a winding fixture having spaced members extending therefrom and being journalled on the trunnion axis of said brackets whereby the winding fixture may swing bodily on the trunnion axis, a bearing carried by said winding fixture on an axis in the plane through the said axis of said form-supporting shaft, a winding arm journalled in said bearing and extending therefrom toward said spherical form, the outer end of said winding arm most nearly adjacent said spherical form having an eyelet terminating in a plane through said trunnion axis, means to rotate said winding arm and said bearing to swing the eyelet in a great circle path about said spherical form, and means to move said winding fixture about said trunnion axis to form a wall of fiber glass windings around said spherical form.

5. Apparatus for making wound fiber glass pressure vessels which comprises a spherical form, a frame, a form-supporting shaft mounted in the frame for rotation, said form-supporting shaft being secured to the spherical form on a polar axis thereof with the axis of the form-supporting shaft aligned with said polar axis, a pair of spaced trunnion brackets projecting from the frame to embrace said form and having their free ends spaced from said spherical form, said brackets being apertured at said free ends to provide a trunnion axis extending through the center of said spherical form, a winding fixture having spaced members extending therefrom and being journalled on the said trunnion axis of said brackets whereby the winding fixture may swing bodily about said form on the trunnion axis, a bearing carried by said winding fixture on an axis coplanar with the axis of said form-supporting shaft, a winding arm journalled in said bearing and extending therefrom toward said spherical form, the outer end of said winding arm most nearly adjacent said spherical form having an eyelet terminating in a plane normal to the bearing axis and through said trunnion axis, means to rotate said winding arm and said bearing to swing the eyelet in a great circle path about said spherical form to form layers extending from one end of said polar axis to the other, and means to move said winding fixture bodily about said trunnion axis to form additional layers of lesser polar extent.

6. Apparatus for making wound fiber glass pressure vessels which comprises a frame, a low melting point cast metal spherical form, a rigid tubular member extending through said form from one pole on the sphere to an opposite pole, a form-supporting shaft mounted in the frame for rotation, one end of said form-supporting shaft being secured to one end of said tubular member in the form with the axis of the tubular member coincident with the axis of the form-supporting shaft, a pair of spaced frame brackets having their free ends terminating at opposite sides of the said spherical form and being apertured at said free ends to provide a trunnion axis extending through the center of said spherical form, a winding fixture having spaced ears extending therefrom and journalled at their free ends on the trunnion axis of said brackets whereby the winding fixture may swing bodily on the trunnion axis, a rotatable member carried by said winding fixture on an axis in a plane through the axis of said form-supporting shaft, a winding arm carried by said rotatable member and extending therefrom toward said spherical form, the outer end of said winding arm most nearly adjacent said spherical form having an eyelet terminating in a plane through said trunnion axis, means to rotate said winding arm and said rotatable member to swing the eyelet in a great circle path between said spherical form and the frame brackets, means to move said winding fixture about said trunnion axis to change the angle of the plane of the great circle path relative to the axis of the form-supporting shaft, and means to guide a strand of winding material through liquid resin to said eyelet.

References Cited in the file of this patent

UNITED STATES PATENTS

| | | |
|---|---|---|
| 2,153,408 | Bogoslowsky | Apr. 4, 1939 |
| 2,518,967 | Witt | Aug. 15, 1950 |
| 2,782,809 | Smallridge | Feb. 26, 1957 |
| 2,788,836 | Trevaskis | Apr. 16, 1957 |
| 2,901,190 | Wentz | Aug. 25, 1959 |